United States Patent [19]

Omori

[11] Patent Number: 4,744,119
[45] Date of Patent: May 17, 1988

[54] METHOD OF MAKING A TWO-PIECE CAPPED LUG NUT

[76] Inventor: Shigeru Omori, Unagidani Mishinomachi, Minamiku, Osaka, Japan

[21] Appl. No.: 27,625
[22] Filed: Mar. 19, 1987

Related U.S. Application Data

[63] Continuation of Ser. No. 799,396, Nov. 19, 1986, abandoned.

[51] Int. Cl.⁴ .............................................. B21D 53/24
[52] U.S. Cl. ..................................................... 10/86 C
[58] Field of Search ................... 10/86 R, 86 C, 72 R; 219/93; 228/165, 173.3; 411/429, 430

[56] References Cited

U.S. PATENT DOCUMENTS

| | | | |
|---|---|---|---|
| 1,830,787 | 11/1931 | Ferry | 10/86 C |
| 3,955,231 | 5/1976 | Erdmann | 10/86 C |
| 4,255,641 | 3/1981 | Connell et al. | 219/61 |
| 4,275,285 | 6/1981 | Jadach | 10/86 CX |

FOREIGN PATENT DOCUMENTS 512983  2/1955  Italy ..................... 10/86 C

Primary Examiner—E. Michael Combs
Attorney, Agent, or Firm—Drucker & Sommers

[57] ABSTRACT

A production method for a two-piece capped lug nut which consists of a nut and cap which is attached to the top. The top of the nut has a grooved, serrated or roughened surface and a protrusion for positioning. When the cap is positioned on the nut, the cap is correctly centered by the protrusion and at the same time, the flange portion of the cap is positioned over the grooved, serrated or roughened surface. Then the nut and the cap are welded under pressure together by running electrical current through them.

6 Claims, 1 Drawing Sheet

METHOD OF MAKING A TWO-PIECE CAPPED LUG NUT

This application is a continuation, of application Ser. No. 799,396, filed 11/19/86 abandoned.

FIELD OF THE INVENTION

This invention concerns mainly the method of production of two-piece capped lug nuts used in mounting automobile wheels.

PRIOR ART

Previously, in order to simplify production and to cut costs, the production method for producing a two-piece capped lug nut consisted of manufacturing the nut and the cap separately, and the cap was positioned on top of the nut. Then they were welded under pressure by running electric current through them.

However, in the case of the method described above, the top surface of the nut is flat, so during the manufacturing process, problems such as vibration cause the cap to move off center on the nut and the cap damaging the electrode by hitting it during welding. Even when it is slightly off center, the product appears to be defective. Furthermore, during welding, part of the molten metal between the cap and the nut squeezes out to a burr, due to the pressure applied by the process, so that a removal process, for the burr, is required afte welding.

SUMMARY OF THE INVENTION

The aim of this invention is to completely solve the problems mentioned above. Its novel characteristics are a nut, having a slightly raised cylindrical centering projection on its top surface, said top surface also being provided with a grooved or serrated surface surrounding the cylindrical projection. The cylindrical projection is complementary with the bottom edge of the cap and correctly positions the cap on the nut; and at the same time, the flange of the cap is positioned over the grooved or serrated surface of the nut. The nut and the cap are then welded together, under pressure, by running electrical current through them.

The cap is produced from sheet metal through a conventional stamping process. The nut is produced by screw machining a forged material made by conventional forging equipment.

The grooved or serrated surface of the nut, and the protrusion thereon, are formed by a forging tool which contains a complementary grooved or serrated surface and indented section. Also, it is possible to form the grooved or serrated surface and the protrusion by a stamping or a cutting process. A typical example of the grooved or serrated surface comprises a multitude of concentric circles, but radially arranged grooves or a multitude of randomly arranged grooves are also feasible. A typical example of the centering protrusion is a slightly raised concentric cylinder.

DETAILED DESCRIPTION OF THE INVENTION

The following is a detailed description of the operation of this invention. In this specification, FIG. 2 is used as a reference for the of top and bottom relationship.

Figure 1:
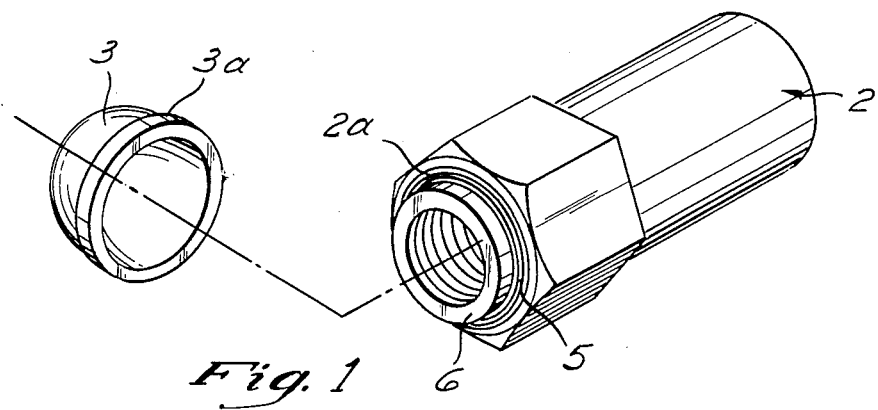
FIG. 1 is a perspective view of nut and cap of this invention, prior to the assembly and welding operation of the said two components.
Figure 2:
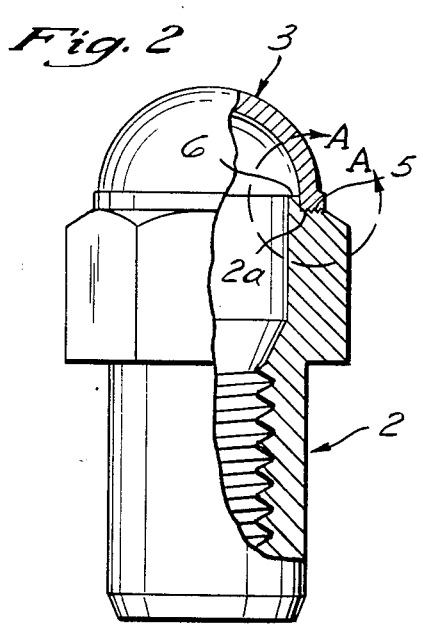
FIG. 2 is an assembled view of nut and cap, shown partially, in longitudinal cross-section.

The initially two-piece nut produced by this invention's method consists of, as in FIGS. 1 and 2, a nut (2) and a cap (3) which is affixed to the top of nut (2).

Figure 3:
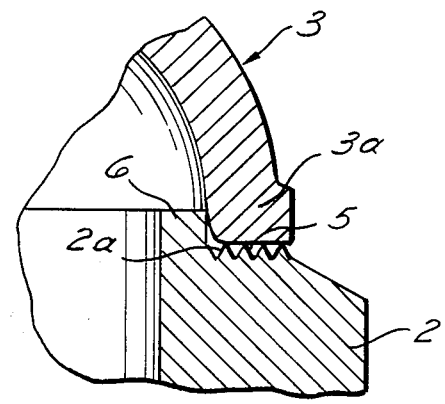
FIG. 3 is an enlarged cross-sectional view of the assembled nut and cap, prior to the welding thereof, and taken along the arcuate line A—A of FIG. 1.

As indicated in FIGS. 1-3, a grooved surface (5) consisting of a multitude of concentric grooved circles is formed on the top surface (2a) of the nut (2) and a cylindrical protrusion (6) is formed at the inside edge of the top surface (2a) of the nut.

As best indicated in FIG. 3, the cap (3) has a flange 3a formed at its bottom opening, the inside diameter of flange 3a being the same as the outside diameter of the protrusion (6). By placing the bottom opening of the cap (3) over the protrusion (6) of the nut (2), the cap (3) is automatically positioned at the correct location at the top of the nut (2) and at the same time, the bottom surface of the flange (4) of the cap (3) is correctly positioned over the grooved or serrated surface (5) of the nut (2).

Figure 4:
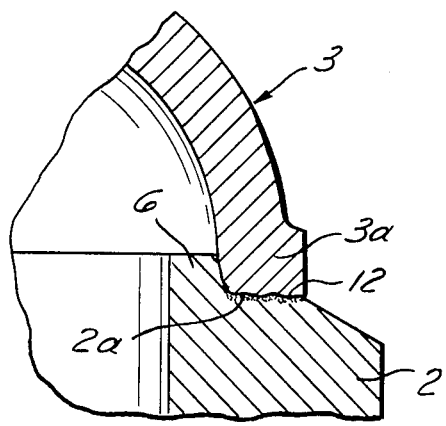
FIG. 4 is a view of FIG. 3 after the welding of the nut and cap components.

Then, in the state shown in FIG. 3, by using a resistance welding device such as a projection welding device, the nut (2) and the cap (3) are welded together along weld line (12), by means of running a current through them while downward pressure is applied to the cap (3). A two-piece lug nut, as in FIG. 4, is thereby obtained.

Figure 5:
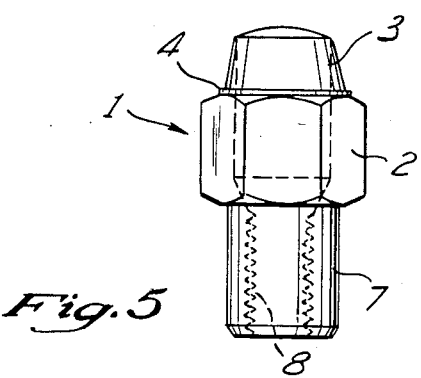

FIG. 5 represents a variation on the nut (2) and it consists of a sleeve (7) under the nut (2) and has a smaller diameter than that of the nut (2) and at the inside surface of the sleeve (7) is a female thread which matches the hub bolt.

In this invention, because of the grooved or serrated surface (5) on the top surface of the nut (2), the molten metal produced by the welding process will flow into the lowest part of the grooved surface (5) when welding the cap (3) on the nut (2). This increases the welded surface area which means an increase in strength of the welded joint and at the same time, completely eliminates the burr caused by the molten metal being squeezed out from between two parts. Also, the protusion (6) on the nut (2) accurately positions the cap (3) to the nut (2). Also, the presence of the grooved surface (5) increases the frictional resistance between the nut (2) and the cap (3) which helps to avoid the cap (3) to move off center on the nut (2). The increase in the frictional resistance by the use of a grooved or serrated surface mentioned above (5) together with the centering protrusion (6), completely eliminates off centering of the cap (3) to the nut (2). This is extremely advantageous when using such equipment as the projection welder which requires an accurate positioning of the two parts being welded together.

The centering projection (6) is preferably slightly raised and cylindrical but other centering projections may be employed together with complementary shaped bottom openings in the cap. Also, the serrated top surface may be randomly roughened or comprise a multiplicity of radially grooved surfaces as well as concentrically grooved surfaces.

I intend to be bound only by the claims which follow.

I claim:

1. A process for making a two-piece capped nut from a nut having a horizontal top surface and a cap having a bottom edge, which comprises the steps of:
    (a) forming serrations on said horizontal top surface of the nut to be capped;
    (b) forming a centering projection on said top surface of said nut;
    (c) assembling said cap to said nut, said cap having a bottom opening complementary to said centering projection of said nut, to center said cap onto said nut, the bottom edge of said cap resting on said serrated top surface of said nut; and
    (d) welding said cap onto said nut, under pressure along the adjacent bottom edge of said cap and said serrated top surface of said nut, whereby molten metal produced during the welding operation flows only into the serrations of said top surface to create a relatively strong weld.

2. The process of claim 1, including the step of selecting a cap wherein said bottom edge of said cap is flanged.

3. The process of claim 2, including the step of providing a cylindrical centering projection having a smooth surface and an outside diameter that is the same as the inside diameter of the flange.

4. The process of claim 1 wherein said serrations in said top surface of said nut comprise grooved areas.

5. The process of claim 1 wherein said centering projection is a slightly raised cylindrical projection, and the said bottom opening of said cap has an inside diameter equal to the outside diameter of said cylindrical projection.

6. The process of claim 1 wherein said serrated top surface of said nut comprises a plurality of concentrically grooved circles formed in said top surface of said nut.

* * * * *